United States Patent [19]
Rusnak et al.

[11] Patent Number: 6,098,056
[45] Date of Patent: Aug. 1, 2000

[54] SYSTEM AND METHOD FOR CONTROLLING ACCESS RIGHTS TO AND SECURITY OF DIGITAL CONTENT IN A DISTRIBUTED INFORMATION SYSTEM, E.G., INTERNET

[75] Inventors: David J. Rusnak, Gaithersburg; John T. Zientara, Chevy Chase, both of Md.

[73] Assignee: International Business Machines Corporation, Armonk, N.Y.

[21] Appl. No.: 08/977,687

[22] Filed: Nov. 24, 1997

[51] Int. Cl.[7] .................................................. G06F 17/60
[52] U.S. Cl. ................. 705/75; 713/200; 705/76
[58] Field of Search ........................... 380/4, 51; 705/40, 705/75, 76, 1; 713/200

[56] References Cited

U.S. PATENT DOCUMENTS

| | | | |
|---|---|---|---|
| 4,827,508 | 5/1989 | Shear ............................................ | 380/4 |
| 4,977,594 | 12/1990 | Shear ............................................ | 380/4 |
| 5,050,213 | 9/1991 | Shear ............................................ | 380/25 |
| 5,436,972 | 7/1995 | Fischer ......................................... | 380/25 |
| 5,557,518 | 9/1996 | Rosen ........................................... | 364/408 |
| 5,557,765 | 9/1996 | Lipner et al. ............................... | 380/21 |
| 5,590,199 | 12/1996 | Krajewski et al. ......................... | 380/25 |
| 5,621,797 | 4/1997 | Rosen ........................................... | 705/76 |
| 5,629,980 | 5/1997 | Steifik et al. ............................... | 380/4 |
| 5,642,419 | 6/1997 | Rosen ........................................... | 705/76 |
| 5,878,139 | 3/1999 | Rosen ........................................... | 705/75 |
| 5,889,868 | 3/1999 | Moskowitz et al. ........................ | 380/51 |
| 5,892,900 | 4/1999 | Ginter et al. ............................... | 713/200 |

OTHER PUBLICATIONS

Schneier, Bruce. "Applied Cryptography: Protocols, Algorithms, and Source code in C" 2d. (New York: John Wiley & Sons, Inc., Jan. 1996) pp. v & 21–27.

Lawton, George. Intellectual–Property Protectioon Opens Path for E–commerce. "Computer" IEEE Computer Societyu, vol. 33, No. 2 (Feb. 2000) 14–17 & 21.

*Primary Examiner*—James P. Trammell
*Assistant Examiner*—John Leonard Young
*Attorney, Agent, or Firm*—Morgan & Finnegan, L.L.P.; Joseph C. Redmond, Jr.; Steven J. Meyers

[57] ABSTRACT

A system and method for limiting access to and preventing unauthorized use of an owner's digital content stored in an information network and available to clients under authorized conditions. The network includes at least one server coupled to a storage device for storing the limited access digital content encrypted using a random-generated key, known as a Document Encryption Key (DEK). The DEK is further encrypted with the server's public key, using a public/private key pair algorithm and placed in a digital container stored in a storage device and including as a part of the meta-information which is in the container. The client's workstation is coupled to the server for acquiring the limited access digital content under the authorized condition. A Trusted Information Handler (TIH) is validated by the server after the handler provides a data signature and type of signing algorithm to transaction data descriptive of the purchase agreement between the client and the owner. After the handler has authenticated, the server decrypts the encrypted DEK with its private key and re-encrypts the DEK with the handler's public key ensuring that only the information handler can process the information. The encrypted DEK is further encrypted with the client's public key personalizing the digital content to the client. The client's program decrypts the DEK with his private key and passes it along with the encrypted content to the handler which decrypts the DEK with his private key and proceeds to decrypt the content for displaying to the client.

26 Claims, 4 Drawing Sheets

SYSTEM AND METHOD FOR CONTROLLING ACCESS RIGHTS TO AND SECURITY OF DIGITAL CONTENT IN A DISTRIBUTED INFORMATION SYSTEM, E.G., INTERNET

BACKGROUND INFORMATION

1. Field of the Invention

This invention relates to information systems. More particularly, the invention relates to systems and methods for controlling access rights to digital contents in a Distributed Information System (DIS), e.g., the Internet.

2. Description of Prior Art

Owners of digital content stored and available to the public in an information system would like to ensure that payment has been received in some form and use restrictions observed prior to granting access rights to use the contents. Such access rights can be limited to a particular user for a limited period of time. Information handlers which enforce an owner's content restrictions, for example, restricting the user's right to save content to a storage device are presently available to owners. However, in order to make use of such content restrictions practical in a widely-distributed environment, such as the Internet, there must be a mechanism by which the appropriate information-handler can be readily identified and supplied with contents in a secure manner. A trusted information handler is a mechanism that permits limited access to digital content as specified by the owner of that content. Such trusted information handler should be easily replaced enabling new forms of content to be accessed in a secure manner. Also, such mechanism should permit the easy addition and replacement of such handlers.

Prior art related to limiting access rights to digital content in an information system includes the following:

U.S. Pat. No. 5,436,972 discloses a method for preventing inadvertent betrayal by a trustee of escrowed digital secrets. After unique identification data describing a user has been entered into a computer system, the user is asked to select a password to protect the system. All personal identifying data, together with the password, is encrypted with a trustee's public key and stored, for example, in the user's computer system as an escrow security record. The password is then used to encrypt all data on the user's disk. If at some point in time, the user forgets the password, the user contacts the trustee's, for example, the vendor or the manufacturer. The trustee utilizes documentary evidence presented by the alleged legitimate user and determines whether such evidence matches with the previously encrypted escrowed information stored in the escrow records created by the user. If the records agree, then the trustee has confidence that the true owner is making request and that revealing the secret password will not betray the owner's interest.

U.S. Pat. No. 5,557,518 issued Sept. 17, 1996, discloses a system to open electronic commerce using trusted agents. A customer-trusted agent securely communicates with a first money module. A merchant-trusted agent securely communicates with a second money module. Both trusted agents are capable of establishing a first cryptographically-secure session. Both money modules are capable of establishing a second cryptographically-secure session. The merchant-trusted agent transfers electronic merchandise to the customer-trusted agent, and the first money module transfers electronic money to the second money module. The money module informs the trusted agents of the successful completion of payment and the customer may use the purchased electronic merchandise.

U.S. Pat. No. 5,557,765 discloses a system and method for data recovery. An encrypting user encrypts a method using a secret storage key (KS) and attaches a Data Recovery Field (DRF), including an Access Rule Index (ARI) and the KS to the encrypted message. The DRF and the encrypted message are stored in a storage device. To recover the storage key (KS) a decrypting user extracts and sends the DRF to a Data Recover Center (DRC) and issues a challenge based on Access Rules (ARs) originally defined by the encrypting user. If the encrypting user meets the challenge, the DRC sends the KS in a message to the encrypting user. Generally, KS need not be an encryption key but could represent any piece of confidential information that can fit inside the DRF. In all cases, the DRC limits access to decrypting users who can meet the challenge to find in either the ARs defined by the encrypting user or the ARs defined for override access.

U.S. Pat. No. 5,590,199 issued Dec. 31, 1996, filed Oct. 12, 1993, discloses a system for authenticating and authorizing a user to access services on a heterogenous computer network. The system includes at least one workstation and one authorization server connected to each other through a network. A user couples a personally protectable coprocessor (smart card) to the workstation by means of a bidirectional communications channel. The coprocessor is adapted to receive signals including first encrypted authentication information and decrypt the first encrypted authentication information using a preselected first key. The coprocessor is further adapted to assemble and encrypt second authentication information using a preselected second key and to transmit the encrypted second encrypted authentication information to the workstation. The workstation then communicates the information on to the network whereby the user is authenticated to access the network computer or service.

U.S. Pat. No. 4,827,508; U.S. Pat. 4,977,594 issued Dec. 11, 1990, a division of the '508 patent, and U.S. Pat. No. 5,050,213 issued Sept. 17, 1991, a continuation of the '594 patent, disclose a database access system and method at a user site which permits authorized users to access and use the database and prevent unauthorized database use and copying. A facility is disclosed for measuring usage of the on-site database for purposes of billing the user according to the amount the database has been used. Periodically, the measured usage information is conveyed to the database owner while preventing the user from tampering with the measured usage information.

None of the prior art discloses a system and method for using a trusted information handler and a digital container techniques in an information network which assures that an owner's digital content is not accessed without the owner's permission and use restrictions observed, thereby enabling valuable digital content to be transferred and/or sold electronically with the assurance that the owner's rights are fully protected.

SUMMARY OF THE INVENTION

An object of the invention is a system and method for limiting access to digital content in an information system.

Another object is a trusted information handler in an information system which controls access to digital content by a client, according to an owner's restrictions.

Another object is a trusted information handler in an information network which uses cryptographic techniques in limiting access to digital content in the network.

Another object is a system and method of validating a trusted information handler's authorization to limit access to an owner's digital content.

Another object is a trusted information handler in an information network which decrypts digital content for distribution to a client in accordance with an owner's requirements.

These and other objects, features and advantages are achieved in an information network including a server for providing access to an owner's digital content under the control of a trusted information handler (TIH). When a client accesses the server to acquire the digital content encrypted in a Document Encryption Key (DEK), the server encrypts the DEK with a Server Public Key using a Public/Private key pair algorithm and places the encrypted content in a digital container for storing and transferring information in an information system in a secure manner. The client opens the container and uses a client program to transmit transaction data to the TIH which signs the data using a digital signature; identifies the type of signing algorithm; and provides a certificate of authority to the client program. (In the event any transaction exchanged between the client and server requires confidentiality, then well know encryption/decryption techniques may be used to implement confidentiality, including but not limited to public key encryption; "shared secret" encryption and symmetric encryption with public key protecting the symmetric cipher key.) The client returns to the server the server encrypted DEK, the TIH certificate, the transaction data, a client signature, and the type of signing algorithm used by the TIH together with a client Public Key in a TIH public/private key. The server re-creates the transaction data and checks for reasonability; authenticates the TIH by (i) confirming the TIH is a known information handler; (ii) validates the TIH certificate, and (iii) confirms the transaction data signature produced by the TIH. After authentication, the server decrypts the DEK with its private key; encrypts the newly encrypted DEK with TIH's public key; encrypts the decrypted key with the client's public key; and returns the doubly encrypted DEK to the client. The client decrypts the DEK with his private key and passes it along with the encrypted digital content to the TIH which proceeds to decrypt the digital content for distribution to the client in accordance with the owner's requirement. The encrypted digital content may be supplied in its' entirety or in discrete amounts, the latter facilitating any metering requirements imposed by the content owner via the TIH.

DESCRIPTION OF DRAWING

The invention will be further understood from the following detailed description of a preferred embodiment taken in conjunction with an appended drawing, in which.

DESCRIPTION OF PREFERRED EMBODIMENT

Figure 1:
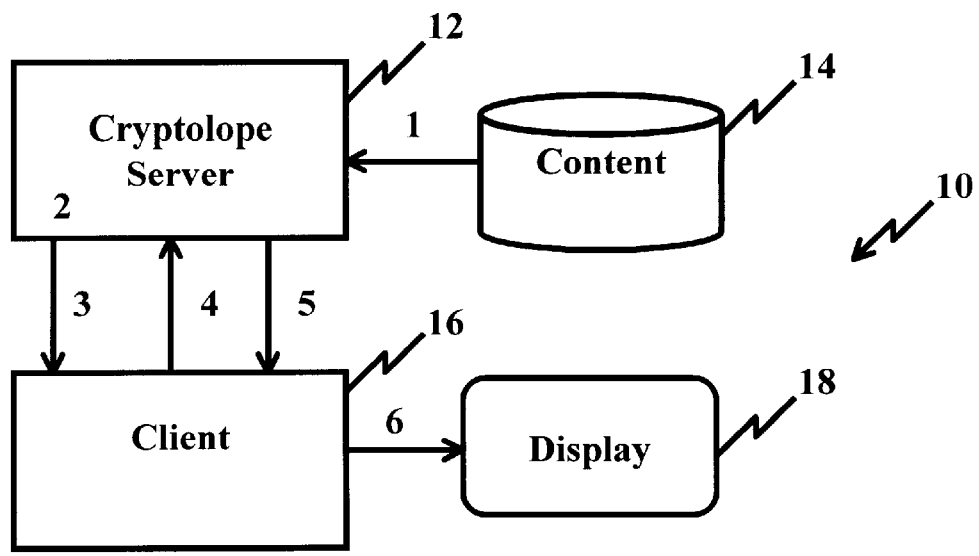
FIG. 1 is a block diagram of a prior art server in an information system which provides secure content delivery in a digital container and ensures payment is received from a particular client before the content is decrypted.

In FIG. 1, a portion of a prior art information system 10 is shown for providing secure content delivery and ensuring payment is received from a client before the content can be decrypted and displayed to the client. Such a system is described in Ser. No. 08/625,475 filed Mar. 29, 1996, assigned to the same assignee as that of the present invention and fully incorporated herein by reference in the present information to ensure the information content is always protected within a secure environment. The prior art system 10 may be part of the Internet or a public switch telephone network (PSTN) and includes a conventional server 12 coupled to a conventional storage device, e.g., disk drive, memory unit, or the like, in which the digital content is stored with limited access for a client(s) or user(s) at a workstation 16 including a display 18. The digital content is transferred in process steps 1–6, as will be described hereinafter, and made available to clients or users within a digital container which in one form may be a cryptolope container 11 shown in FIG. 2. The container 11 is a digital envelope containing a collection of files including the digital content in encrypted form, meta-information about the content, and meta-information about the container itself. Specifically, the container includes encrypted document parts 13 which are the "valuable contents" to be purchased by a client or user; an associated encrypted public encryption key 15 for the parts; a list of container parts 17 and a digital signature 21 for the list. The envelope is a grouping of information parts compatible with a large number of grouping technologies, for example Microsoft's OLE. The cryptolope provides security for the digital content in transit to clients and users. It should be understood, however, that in addition to cryptolope containers there are other digital containers available for transferring information between an information source and client or user in a secure manner in an information system. One such digital container is described in copending application Ser. No. 08/866,305, filed May 5, 1997, assigned to the same assignee as that of the present invention and fully incorporated herein by reference. The information transferred in the container of Ser. No. 08/866,305, referred to as an information objects container, includes application programs and data in addition to documents and text requested by a client or user. In such transfers, the information owner has an increased security interest to limit distribution and usage to such clients or users through the information objects container and other means, such as the trusted information handler of the present invention, as will be described hereinafter. For purposes of description, however, the present invention will be described in terms of the cryptolope container of Ser. No. 08/625,475, but the digital information objects container of Ser. No. 08/866,305 is equally applicable for use in the present invention.

Figure 3:
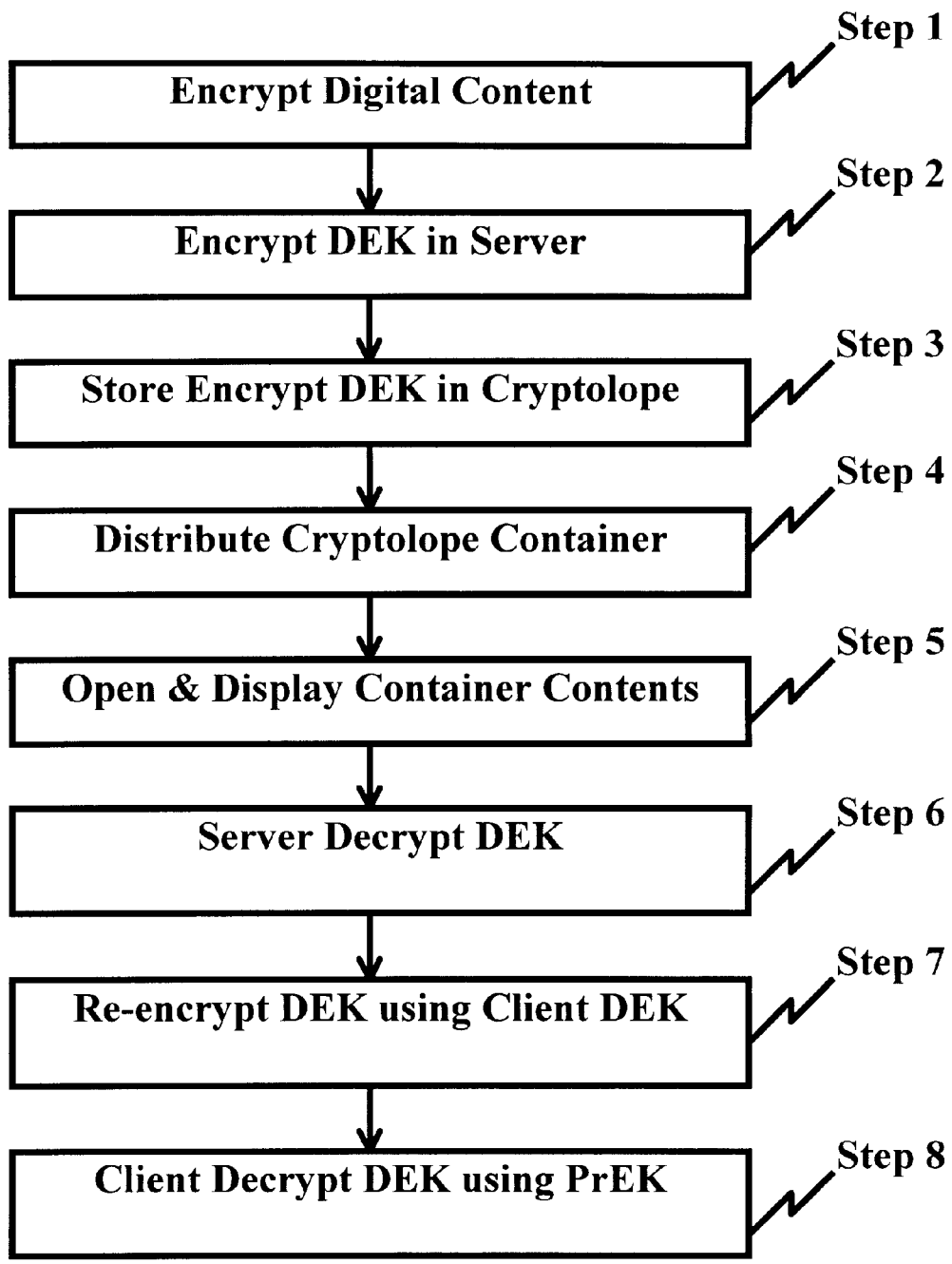
FIG. 3 is a flow diagram of a prior art process for securing content within the digital container of FIG. 1.

In FIG. 3, a prior art process is described by which digital content is secured within a cryptolope container transferred to and then acquired by a client in steps 1–6, as follows:

In step 1, the digital content is encrypted off-line using a randomly generated key, also known as a Document Encryption Key (DEK), and after encryption, stored in the storage unit 14 (See FIG. 1).

In step 2, the DEK is encrypted within the server's 12 public key, using a public/private key pair algorithm, such as the well known RSA cipher.

In step 3, the encrypted DEK is placed within a cryptolope container as part of the meta-information within the container. The above cited Ser. No. 08/625,475 filed Mar. 29, 1996, provides the details for forming the cryptolope container and storing the encrypted digital content in the storage unit 14.

In step 4, the container is distributed to one or more users requesting the digital content with limited access.

In step 5, a client program opens the container and displays the meta-information to a user. The client program has its own public/private key pair which was generated at installation time or received out of band from an external provider (Certificate Authority) using an algorithm which is recognized by the server. If the user wishes to purchase the contents of the container, the client program sends all DEK's back to the server along with the public key from the client's public key/private key pair.

In step 6, if all purchase criteria are met, the server decrypts the decrypted DEK with the corresponding server private key, providing a clear DEK.

In step 7, the DEK is then re-encrypted with the client's public key, thus personalizing the digital content to the client which is returned in a crypotolope container to the client in the newly-encrypted DEK.

In step 8, the client program decrypts the DEK with its private key, producing the clear DEK. The client then proceeds to decrypt the content which can be processed as usual by an appropriate information handler, after which the process ends.

Figure 4:
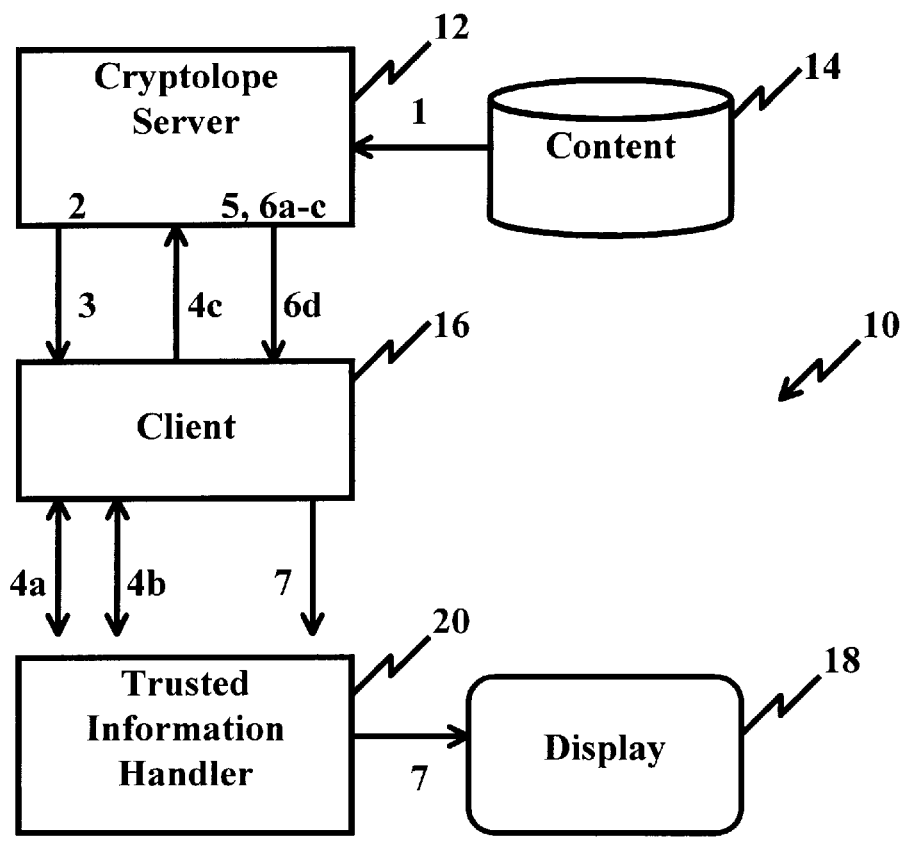
FIG. 4 is a block diagram of an information system providing limited access to digital content in a digital container and incorporating the principles of the present invention.

In order to be certain that the digital content with limited access remains in a secure environment and protected from unauthorized use once decrypted, a trusted information handler (TIH) 20, as shown in FIG. 4, is installed in the client environment of FIG. 1. The handler 20 is known to the server 12 and assures the owner the content in the digital container will be securely transferred and decrypted in process steps 1–7 under the appropriate owner conditions, as will be described hereinafter. Under the system of FIG. 4, content owners can specify the appropriate TIH to process the meta-information contained in the cryptolope container. The handler 20 has its own public/private key pair and the ability to sign arbitrary data using a signing algorithm known to the server. The public/private key pair of the handler 20 may be protected by a variety of mechanisms, including, but not necessarily limited to tamper-resistant smart cards, PCMCIA cards or software obfuscation. The owner of the content determines the security requirements for the content and the TIH provider demonstrates that level of conformance prior to being recognized as a "Trusted Information Handler".

Figure 5:
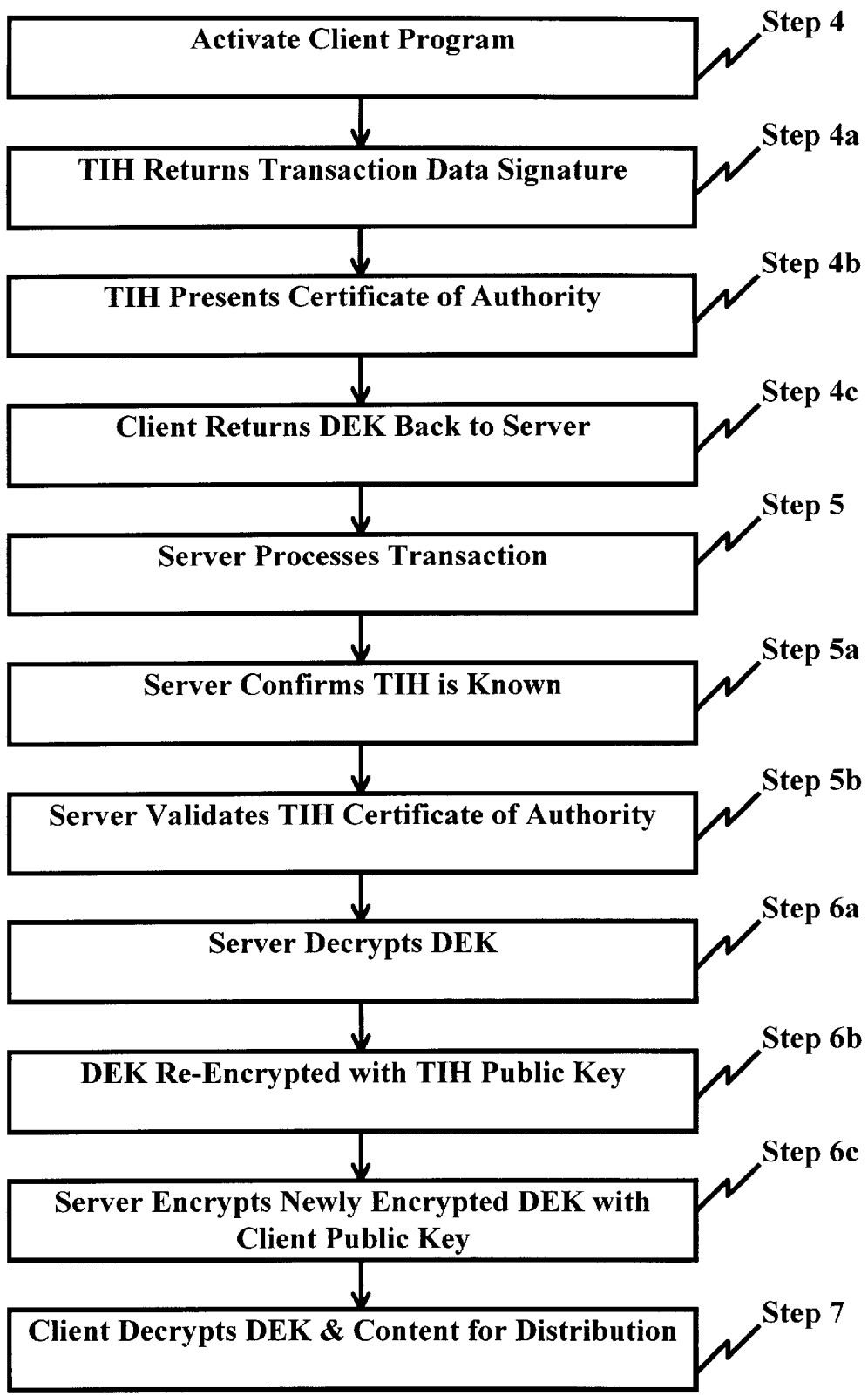
FIG. 5 is a flow diagram of a process for limiting access to digital content in the system of FIG. 3.

In FIG. 5, a process is shown for further protecting the digital content with limited access from unauthorized use after decryption using the system 10' of FIG. 3, as follows:

Steps 1–3 of FIG. 3 are repeated, after which in step 4 a client program opens the container and displays the meta-information contained in the container to the user. At some time prior to step 4, the client program generates key pairs and submits the public key to a Certificate Authority (CA) along with "personal" information pertinent to the type of certificate requested. The CA uses the "personal" information to discern if the client is suitable to receive a certificate for which the client has applied. If the client is suitable, a certificate is created by the CA and encapsulates the client's public key. The public key is used to authenticate signatures of the client. In addition, the CA signs the certificate. In general, well known CAs publicize their public keys so certificates generated by CAs can be authenticated.

If the user wishes to purchase the digital content in the container, step 4a activates a client program to create arbitrary data descriptive of the transaction, after which the handler 20 is requested to provide a digital signature to the transaction data. The handler 20 returns both the transaction digital signature and the type of signing algorithm used by the handler in generating the digital signature.

In step 4b, the handler presents its Certificate of Authority to the client program.

In step 4c, the client program sends all DEK's back to the server 12 along with the public key from its own public key/private key pair; the handler's certificate; the transaction data; the digital signature; and the type of signing algorithm used by the handler 20.

In step 5, when the server processes the transaction for the acquisition of the digital content, the server re-creates the transaction data generated by the client; checks the data for "reasonability", after which the server authenticates the handler 20.

In step 5a, the server confirms that the information handler 20 is a known handler using the name found in the certificate of authority and comparing the name to an approved known specified by the owner.

In step 5b, the server confirms the transaction data signal was produced by the handler 20 after which the certificate of authority for the handler is validated. Validating the certificate may involve validating "issuing" certificates. It is a usual CA practice to create a certificate hierarchy such that not all certificates are signed by the same entity. Thus, multiple certificates may be submitted which represent a trust hierarchy and is commonly referred to as a certificate "chain". Validating certificates in this chain can terminate when a "trusted" certificate is encountered. Applications commonly maintain lists of "trusted" certificates ("trusted" is defined to mean an application assumes the certificates are genuine).

In step 6, after the handler is authenticated by the server and all purchase criteria are met, the server decrypts the encrypted DEK with its corresponding private key, providing a clear DEK in step 6a.

In step 6b, the DEK is re-encrypted with the handler's public key ensuring that only the handler can process and disseminate the digital content.

In step 6c, the server encrypts the newly encrypted DEK again with the client's public key, thus personalizing the digital content to the client and the newly encrypted DEK is returned to the client in step 6d.

In step 7, the client program decrypts the DEK with its private key and passes the key along with the encrypted content to the handler 20 which decrypts the DEK with its private key and proceeds to decrypt the content, after which the digital content can be made available to the client under the owner's conditions ensuring the owner that a known handler is protecting the digital content from unauthorized use after decryption.

Figure 2:
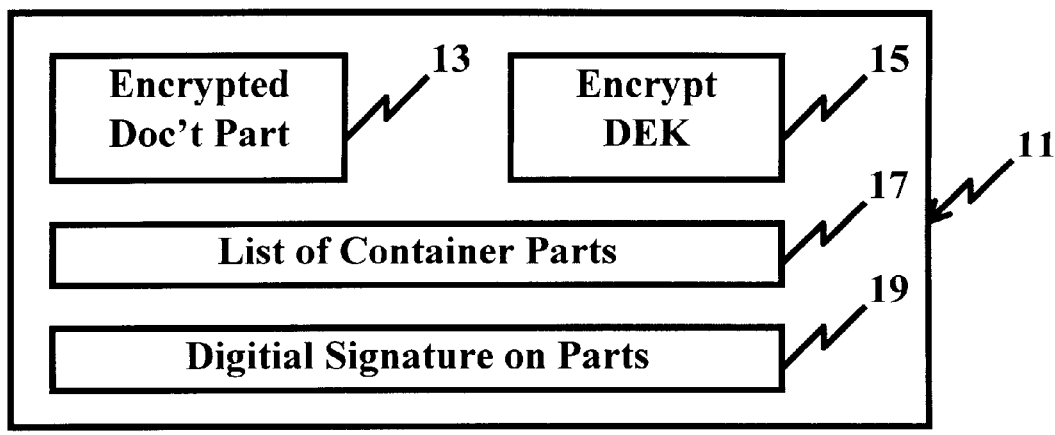
FIG. 2 is a representation of a prior art digital container used in the system of FIG. 1

The system of FIGS. 4 and 5 provide the following advantages over the system of FIGS. 1 and 2, as follows:

Content owners can be assured that only "known" applications will be permitted access to their content since the application must be known to the server and some sort of registration process (and implicit approval) of the trusted information handler (TIH) has previously taken place.

If a trusted information handler is some how compromised, the handler can be removed from interfacing with the server, effectively disabling the handler from future use.

The encrypted DEK cannot be decoded by any other client and trusted information handler combination since both the client and the handler must use their own private encryption keys to encrypt the DEK for access to the content.

While the invention has been shown and described in connection with a preferred embodiment, various modifications may be made without departing from the spirit and scope of the invention, as described in the appended claims, in which:

We claim:

1. In a distributed information system, apparatus for limiting access to an owner's digital content, comprising;
   a) means for storing the owner's content in a document within a digital container and encrypting the document in a Document Encryption Key (DEK);
   b) a secure server coupled to the system and having access to the stored container for encrypting the DEK and transferring the encrypted document in the digital container to a client on request;
   c) a client station coupled to the secure server through the system for receiving the digital container and generating transaction data for acquiring the encrypted document in response to the client;
   d) a Trusted Information Handler (TIH) coupled to the client station;
   e) TIH means for receiving the transaction data and returning to the client station a digital signature, signing algorithm, a TIH authenticating certificate and a TIH public key for return to the client means and transfer in the digital container to the server means together with the encrypted DEK and a client public key;
   f) server means for decrypting the DEK; re-encrypting the DEK in the client public key and the TIH public key and transferring the double encrypted DEK to the client station; and
   g) means for transferring the TIH encrypted DEK to the TIH for decryption and return of the decrypted document to the client station.

2. The system of claim 1 further comprising;
   a) means for processing the transaction data in the server by (i) confirming the transaction and that the TIH is known; (ii) validating the TIH; and (iii) confirming the digital signature was produced by the TIH.

3. The system of claim 1 further comprising;
   a) means for decrypting the server encrypted DEK and doubly encrypting the DEK using the TIH public key followed by the client public key.

4. The system of claim 1 wherein the client station further comprises:
   a) means for (i) decrypting the DEK using the client private key and (ii) transmitting the encrypted digital content and encrypted DEK to the TIH.

5. The system of claim 1 wherein the TIH further comprises:
   a) means in the TIH for (i) decryption of the digital content after decryption of the encrypted DEK using the TIH private key and (ii) providing the decrypted digital content to the client station.

6. The system of claim 1 further comprising:
   a) means for creating data descriptive of the transaction; and means for presenting the data to the TIH for a digital signature and signing algorithm.

7. In a distributed information system, apparatus for limiting access to an owner's digital content encrypted in a cryptolope container using a Document Encryption Key (DEK), comprising;
   a) means for storing the owner's content in a document within a digital container in the system and encrypting the document in a Document Encryption Key (DEK);
   b) a cryptolope server coupled to the system and having access to the stored container;
   c) means in the cryptolope server for encrypting the DEK using a public/private key pair and incorporating the encrypted DEK into the container;
   d) a client station coupled to the server through the system and a Trusted Information Handler (TIH);
   e) client station means for (i) acquiring the container from the server in a transaction for purposes of purchase by a purchaser; (ii) creating data descriptive of the transaction, and (iii) presenting the data to the TIH;
   f) TIH means for returning to the client station means a digital signature, signing algorithm, a TIH authenticating certificate and a TIH public key for return thereof by the client station means to the server means together with the encrypted DEK and a client public key;
   g) cryptolope server means for processing the transaction by (i) confirming the transaction and that the TIH is known; (ii) validating the TIH; and (iii) confirming the digital signature was produced by the TIH;
   h) cryptolope server means for decrypting the server encrypted DEK and doubly encrypting the DEK using the TIH public key followed by the client public key;
   i) client means for (i) decrypting the DEK using the client private key and (ii) transmitting the encrypted digital content and encrypted DEK to the TIH; and
   j) TIH means for (i) decryption of the digital content after decryption of the encrypted DEK using the TIH private key and (ii) providing the decrypted digital content to the client station.

8. In a distributed information system including a client station coupled to a trusted information handler (TIH) and a server, a method for limiting access to an owner's encrypted digital content stored in a digital container and encrypted in a Document Encryption Key (DEK), comprising the steps of:
   a) encrypting the DEK in the server using a server public/private key pair and incorporating the encrypted DEK and digital content into the container;
   b) acquiring the container including the encrypted DEK from the server by the client station for purposes of a transaction;
   c) transmitting the encrypted digital content and encrypted DEK to the TIH by the client station;
   d) returning a digital signature, signing algorithm and a TIH authenticating certificate to the server via the client station together with the server encrypted DEK and a TIH public key and a client public key; and
   e) processing the transaction by the server to (i) confirm the transaction and that the TIH is known; (ii) validate the TIH; and (iii) confirm the digital signature was produced by the TIH.

9. The process of claim 8 further comprising the step of:
   a) decrypting the server encrypted DEK and doubly encrypting the DEK using the TIH public key and the client public key for return thereof to the purchaser together with the encrypted digital content.

10. The process of claim 8 further comprising the step of:
    a) decrypting the DEK using the client private key and transmitting the encrypted digital content and encrypted DEK to the TIH.

11. The process of claim 8 further comprising the step of:
 a) decrypting the digital content at the TIH after decryption of the encrypted DEK using the TIH private key.

12. The process of claim 8 further comprising the step of:
 a) providing the decrypted digital content from the TIH to the client station.

13. The method of claim 8 further comprising the step of:
 (a) creating data descriptive of the transaction, and (ii) presenting the data to the TIH for a digital signature and signing algorithm.

14. The method of claim 8 wherein the digital container is a cryptolope or an information objects container.

15. In a distributed information system, apparatus for limiting the use of an owner's digital content in accordance with the owner's requirement, comprising;
 a) means for encrypting the owner's digital content in a document using a Document Encryption Key (DEK) stored with the document in a cryptolope;
 b) server means in the system for accessing the document in the cryptolope and encrypting the DEK in a server public key part of a server public/private key pair;
 c) client station means in the system for acquiring the cryotolope from the server and generating transaction data relating to the document;
 d) trusted information handler (TIEI) means in the system for acquiring and processing the transaction data for return to the client station after signing the data using a signing algorithm; identifying the signing algorithm; providing a certificate of authority and a TIH public key in a TIH public/private key pair;
 e) client station means for returning to the server means in the cryptolope the transaction data processed by the TIH including the TIH public key; the server encrypted DEK and a client station public key part of a client station public/private key pair;
 f) server means for recreating the transaction data; confirming the TIH; decrypting the server encrypted DEK; doubling encrypting the DEK in the TIH public and client station public key, respectively for return of the DEK encrypted document to the client station in the cryptolope;
 g) client station means for receiving the cryptolope; decrypting the encrypted DEK using the client private key and transferring the encrypted DEK document to the TIH; and
 h) means for decryption of the DEK at the TIH using the TIH private key and distribution of the decrypted DEK document to the client station in accordance with the owner's requirements.

16. In a distributed information system including a client station coupled to a trusted information handler (TIH) and a server, a method for limiting the use of an owner's digital content acquired from the system in accordance with an owner's requirement, comprising the steps of:
 a) encrypting the owner's digital content in a document using a Document Encryption Key (DEK) stored with the document in a cryptolope;
 b) accessing the document in the cryptolope at the server and encrypting the DEK in a server public key part of a server public/private key pair;
 c) acquiring the cryotolope from the server at the client station and generating transaction data relating to the DEK encrypyted document;
 d) acquiring and processing the transaction data at the TIH for return to the client station after signing the transaction data using a signing algorithm; identifying the signing algorithm; providing a certificate of authority and a TIH public key in a TIH public/private key pair;
 e) returning to the server means by the client station the cryptolope containing the transaction data processed by the TIH including the TIH public key; the server encrypted DEK document and a client station public key part of a client station public/private key pair;
 f) recreating at the server station the transaction data; confirming the TIH; decrypting the server encrypted DEK; doubling encrypting the DEK in the TIH public and client station public key, respectively for return of the DEK encrypted document to the client station in the cryptolope;
 g) receiving the cryptolope at the client station and decrypting the doubly encrypted DEK using the client private key and transferring the encrypted DEK document to the TIH; and
 h) decrypting the DEK at the TIH using the TIH private key and distribution of the decrypted DEK document to the client station in accordance with the owner's requirements.

17. Apparatus for limiting the use of an owner's digital content in accordance with the owner's requirements comprising;
 a) server means for encrypting a DEK of an owner's encrypted digital content using a server public key pan of a server public/private key pair;
 c) client station means for acquiring the server encrypted DEK and the owner's encrypted digital content in a secure container and generating transaction data relating to the owner's encrypted digital content; and
 d) a triasted information handler (TIH) for acquiring the transaction data in the secure container and processing the transaction data for return to the server in the secure container via the client station after signing the data using a signing algorithm.

18. The apparatus of claim 17 further comprising:
 e) client station means for returning to the server means the transaction data processed by the TIH and TIH public key; the server encrypted DEK and owner's encrypted digital content and a client station public key part of a client station public/private key pair.

19. The apparatus of claim 17 further comprising:
 f) server means for recreating the transaction data; confirming the TIH; decrypting the server encrypted DEK; doubling encrypting the DEK in the TIH public and client station public key, respectively for return of the doubly encrypted DEK and encrypted owner's digital content to the client station.

20. The apparatus of claim 17 further comprising
 g) client station means for decrypting the encrypted DEK using the client private key and transferring the encrypted DEK and owners encrypted digital content document to the TIH.

21. The apparatus of claim 17 further comprising:
 h) TH means for decryption of the encrypted DEK using the TIH private key and decryption of the owner's encrypted digital content using the DEK document and transferring the decrypted owner's digital content to the client station according to the owner's requirements.

22. In apparatus including a server, a client station and a trusted information handler (TIH) coupled to the client station, a method for limiting the use of an owner's digital content in the apparatus in accordance with an owners requirements, comprising the steps of:

a) encrypting the owner's digital content in a document using a Document Encryption Key (DEK) stored with the document;

b) accessing the encrypted document at the server and encrypting the DEK in a server public key part of a server public/private key pair;

c) acquiring the encrypted document at the client station in a secure container and generating transaction data relating to the encrypted document; and d) acquiring the transaction data in the secure container and processing the Transaction data at the TIH for return to the server in the secure container via the client station after signing the transaction data using a signing algorithm; identifying the signing algorithm; providing a certificate of authority and a TIH public key in a TIH public/private key pair.

23. The method of claim 22 further comprising the step of:

e) returning to the server means by the client station the transaction data processed by the TIH including the TIH public key; the server encrypted DEK document and a client station public key part of a client station public/private key pair.

24. The method of claim 22 further comprising the step of:

f) recreating at the server station the transaction data; confirming the TIH; decrypting the server encrypted DEK; doubling encrypting the DEK in the TIH public and client station public key, respectively for return of the doubly encrypted DEK and encrypted document to the client station.

25. The method of claim 22 further comprising the step of:

g) receiving the doubly encrypted DEK and encrypted document and decrypting the doubly encrypted DEK using the client private key and transferring the encrypted DEK end encrypted document to the TIH.

26. The method of claim 22 further comprising the step of:

h) decrypting the DEK at the TIH using the TIH private key and decrypting the document using the DEK for distribution of the decrypted document to the client station in accordance with the owner's requirements.

* * * * *

UNITED STATES PATENT AND TRADEMARK OFFICE
CERTIFICATE OF CORRECTION

PATENT NO. : 6,098,056

DATED : August 1, 2000

INVENTOR(S) : David J. Rusnak, et al.

Page 1 of 2

It is certified that error appears in the above-identified patent and that said Letters Patent is hereby corrected as shown below:

In Claim 8 at Col. 8, line 37, change "trusted information handler" to --Trusted Information Handler--; and
line 51, after "returning", change "a" to --the--.

In Claim 15 at Col. 9, line, 24, change "cryotolope" to --cryptolope-- and
line, 26, change "trusted information handler (TIEI)" to --Trusted Information Handler (TIH)--.

In claim 16, Col. 9, line 53, change "trusted information handler" to --Trusted Information Handler--;
line 63, change "cryotolope" to cryptolope--; and
line 65, change "encrypyted" to --encrypted--.

In Claim 17. Col. 10, line 27, change "pan" to --part--;
line 29, change "c)" to --b)--, and
line 34, change "d) triasted information handler" to --c) Trusted Information Handler--;

In Claim 18, Col. 10, line 40, change "e)" to --d)--.

In Claim 19, Col. 10, line 46, change "f)" to --e)--.

UNITED STATES PATENT AND TRADEMARK OFFICE
CERTIFICATE OF CORRECTION

PATENT NO. : 6,098,056

DATED : August 1, 2000

INVENTOR(S) : David J. Rusnak, et al.

It is certified that error appears in the above-identified patent and that said Letters Patent is hereby corrected as shown below:

In Claim 20, Col. 10, line 53, change "g)" to --f)--.

In Claim 21, Col. 10, line 58, change "h) TH" to --g) TIH--.

In Claim 22, Col. 10, line 64, change "trusted information handler" to --Trusted Information Handler--; and
Col. 11, line, 11, change "Transaction" to --transaction--.

Signed and Sealed this

Eighth Day of May, 2001

Attest:

NICHOLAS P. GODICI

Attesting Officer

Acting Director of the United States Patent and Trademark Office